(12) United States Patent
Kamben

(10) Patent No.: US 9,381,766 B2
(45) Date of Patent: Jul. 5, 2016

(54) MULTI-LAYER PRINTABLE FILM

(71) Applicant: IKONICS CORPORATION, Duluth, MN (US)

(72) Inventor: Daniel J. Kamben, Duluth, MN (US)

(73) Assignee: Ikonics Corporation, Duluth, MN (US)

( * ) Notice: Subject to any disclaimer, the term of this patent is extended or adjusted under 35 U.S.C. 154(b) by 0 days.

(21) Appl. No.: 14/199,772

(22) Filed: Mar. 6, 2014

(65) Prior Publication Data

US 2014/0255624 A1    Sep. 11, 2014

Related U.S. Application Data

(60) Provisional application No. 61/773,795, filed on Mar. 6, 2013.

(51) Int. Cl.

| | |
|---|---|
| *B41M 5/00* | (2006.01) |
| *B41M 5/52* | (2006.01) |
| *B41M 5/50* | (2006.01) |
| *B32B 27/30* | (2006.01) |
| *B32B 27/28* | (2006.01) |
| *B32B 27/08* | (2006.01) |
| *B32B 27/40* | (2006.01) |

(52) U.S. Cl.
CPC .............. *B41M 5/52* (2013.01); *B32B 27/08* (2013.01); *B32B 27/283* (2013.01); *B32B 27/30* (2013.01); *B32B 27/308* (2013.01); *B32B 27/40* (2013.01); *B41M 5/506* (2013.01); *B41M 5/529* (2013.01)

(58) Field of Classification Search
CPC ........ B32B 27/08; B32B 27/30; B32B 27/40; B32B 27/308; B32B 27/283; B41M 5/5254; B41M 5/506; B41M 5/508; B41M 5/502; B41M 5/5281; B41M 5/529; C08J 5/18
USPC .......... 428/32.28, 32.38, 195.1, 213, 220, 421
See application file for complete search history.

(56) References Cited

U.S. PATENT DOCUMENTS

| | | | |
|---|---|---|---|
| 2003/0138608 A1 | 7/2003 | Landry-Coltrain et al. | |
| 2004/0202832 A1* | 10/2004 | Nigam et al. | 428/195.1 |
| 2006/0068133 A1 | 3/2006 | Khoultchaev et al. | |
| 2007/0166652 A1* | 7/2007 | Komatsu | B41J 3/407 |
| | | | 430/396 |
| 2007/0207278 A1 | 9/2007 | Mukherjee et al. | |
| 2008/0166507 A1 | 7/2008 | Park et al. | |
| 2010/0328957 A1 | 12/2010 | Hessing | |

OTHER PUBLICATIONS

International Search Report and Written Opinion for PCT Application No. PCT/US2014/021363, mailed Jun. 24, 2014 (12 pages).

* cited by examiner

*Primary Examiner* — Betelhem Shewareged
(74) *Attorney, Agent, or Firm* — Pauly, Devries Smith & Deffner, LLC

(57) ABSTRACT

Embodiments of the invention include ink receptive media for use in prototyping and transfer of a UV curable acid resist ink to surfaces for etching. Further embodiments are directed to an ink receptive media used for prototyping and transfer of a UV curable acid resist ink to surfaces for etching. In some implementations the films of the invention are useful for transfer of acid resist inks, maximizing ink droplet contact angle, and ink receptive surface for prototyping inks.

8 Claims, 1 Drawing Sheet

MULTI-LAYER PRINTABLE FILM

FIELD OF THE INVENTION

The present invention relates to printable films, including prototyping and transfer films.

SUMMARY OF THE INVENTION

Embodiments of the invention include ink receptive media for use in prototyping and transfer of a UV curable acid resist ink to surfaces for etching. In some implementations the films of the invention are useful for transfer of acid resist inks, such as inks to be transferred to a mold, maximizing ink droplet contact angle. The films can also be used as ink receptive surfaces for prototyping inks. In some embodiments the media utilizes sub-micron dispersions of low surface energy polymers or particles to reduce the surface energy for reduced ink drop spread, while also limiting the absorption of the ink into the substrate.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present invention is defined by the appended claims and their legal equivalents.

BRIEF DESCRIPTION OF THE FIGURES

The invention may be more completely understood in connection with the following drawings, in which.

Figure 1:
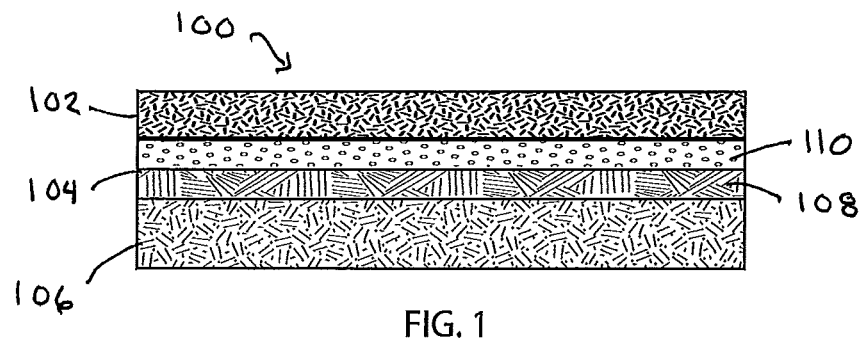
FIG. 1 is a schematic of a cross section of an implementation of an in receptive media constructed and arranged in accordance with an implementation of the invention.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

Embodiments of the invention include ink receptive media for use in prototyping and transfer of a UV curable acid resist ink to surfaces for etching. In some implementations the films of the invention are useful for transfer of acid resist inks, maximizing ink droplet contact angle. The films can also be used as ink receptive surfaces for prototyping inks. In some embodiments the media utilizes low surface energy polymers or particles to reduce the surface energy for reduced ink drop spread while also limiting the absorption of the ink into the substrate.

The introduction of low surface energy materials, such as polymers or particles, to the ink receptive coating provides a lower surface energy than prior boehmite alumina used in inkjet films, reducing the drop spread of the ink. The low surface energy materials, such as polymers or particles, also do not contribute to absorption of the ink and/or components of the ink.

In some implementations the present invention is directed to an ink receptive film containing an ink receptive layer containing low surface energy polymers or particles. In other implementations the ink receptive film comprises a fluorinated surfactant. Suitable low surface energy materials include, for example, fluoropolymers such as polytetrafluoroethylene (PTFE) and/or fluorinated ethylene propylene (FEP), fluorinated particles, siloxanes, waxes, treated silica and treated alumina.

The ink receptive layer also typically includes polyvinyl alcohol or other water soluble film forming polymers. In some implementations the ink receptive layer also includes a plasticizer such as glycerol or polyethylene glycol. The ink receptive layer can be made of various alternative thicknesses. In certain embodiments the ink receptive layer is greater than 0.05 mils thick. In some embodiments the ink receptive layer is less than 0.5 mils thick.

The ink receptive layer can be formed on various sub layers to provide, for example, improved flexibility, to provide adhesion to a substrate, or to provide a transferable film suitable for prototype creation (such as of textured films).

In one such example construction the ink receptive layer is formed on a stretchable sub layer. This sub layer can include ethylene vinyl acetate copolymer. The sub layer can also include polyvinyl alcohol. In some implementations the sub layer further comprises silica. A plasticizer such as glycerol or polyethylene glycol may also be incorporated. Suitable thicknesses for the sub layer include, for example, greater than 0.3 mils or less than 1.5 mils. In some implementations the ink receptive film includes a carrier layer. The carrier layer can be, for example, a polyester layer. In some example implementations the carrier film is less than 2 mils thick. In certain embodiments the carrier film is less than 1.5 mils thick, alternatively less than 1.0 mils thick, and alternatively less than 0.5 mils thick.

The invention is also directed to implementations in which a sub layer provides adhesive properties. The sub layer comprises acrylic adhesive in some embodiments. The sub layer can also include polyvinyl alcohol. In certain embodiments the sub layer comprises glycerol. Silica may also be incorporated into the sub layer. The sub layer is less than 0.2 mils thick in some embodiments, and greater than 0.05 mils thick in some implementations. It is typically desirably to further include a carrier layer, such as a polyester film. The carrier layer can be, for example, less than 4 mils thick, less than 1.0 mils thick, or less than 0.5 mils thick.

In an alternative embodiment the ink receptive film includes a sub layer optimized for use in making a film for printing prototype textures. This sub layer can include a polyurethane dispersion. The sub layer can also include polyethylene glycol. A rheology modifier may also be incorporated. In some implementations the sub layer is greater than 0.3 mils thick. In some implementations the sub layer is less than 2.0 mils thick. The film can include a carrier layer, such as a polyester film. The carrier layer can be, for example less than 2.0 mils thick.

The films or ink receptive media can be designed to control or reduce the spread of a drop, such as to provide a small image size, while retaining high image quality. The films can provide control of the absorption of UV curable ink. The films can provide light adhesion to transfer ink, such as to avoid image distortion, such as during the transfer process, while still allowing it to release from the film during a washout. The films can provide high adhesion to prototype ink, such as to avoid adhesion failure during stretch and to increase durability on an applied part.

In reference now to the drawings, FIG. 1 shows a cross section of ink receptive media 100, according to an embodiment. The ink receptive media 100 can include a water soluble ink receptive top coat 102, a water soluble sublayer 104, and a polyester carrier 106. The water soluble sublayer 104 can include two or more layers, such as a first water soluble sublayer 108 and a second water soluble sublayer 110. In an embodiment, the first water soluble sublayer 108 can be combined with the second water soluble sublayer 110.

The water soluble ink receptive top coat 102 can be at least 0.05 mils thick and up to 0.5 mils thick in certain embodiments. The first water soluble sublayer 108 can be at least 0.05 mils thick and up to 0.5 mils thick. The second water soluble sublayer 110 can be at least 0.1 mils thick and up to 0.5 mils thick. The polyester carrier 106 can be at least 0.5 mils thick and up to 5 mils thick.

The ink receptive media 100 can be designed for the transfer of ink jetted acid resist pattern, such as to a mold. In an embodiment, up to 100% elongation of the ink receptive media 100 can allow the acid resist pattern to be stretched, such as to avoid seams. The elasticity can allow the film to return to within 10% of the original length, such as in cases where initial stretch can cause unacceptable pattern distortion.

The water soluble ink receptive top coat 102 and the water soluble sublayer 104 can be coated onto the polyester carrier 106. In an embodiment, the polyester carrier can be 2 mil thick.

The water soluble ink receptive top coat 102 can include one or more water soluble polymers, such as polyvinyl alcohol, polyvinylpyrollidone, polyethylene oxide, cellulose, and other water soluble polymer types. In an embodiment, the water soluble ink receptive top coat 102 can include at least 30% water soluble polymer and up to 100% water soluble polymer.

The water soluble ink receptive top coat 102 can include one or more low surface energy polymers or particles such as fluorinated polymers, fluorinated particles, siloxanes, waxes, treated silicas, or fluorinated surfactants. In an embodiment, the water soluble ink receptive top coat 102 can include at least 0.5% low surface energy polymers and up to 50% low surface energy polymers.

The water soluble ink receptive top coat 102 can include one or more plasticizers such as glycerol or polyethylene glycol. In an embodiment, the water soluble ink receptive top coat 102 can include at least 0.1% plasticizers and up to 10% plasticizers.

The water soluble ink receptive top coat 102 can include a surfactant. In an embodiment, the water soluble ink receptive top coat 102 can include at least 0.05% surfactant and up to 2% surfactant.

The first water soluble sublayer 108 can include one or more water soluble polymers, such as polyvinyl alcohol, polyvinylpyrollidone, polyethylene oxide, cellulose, and other water soluble polymer types. In an embodiment, the first water soluble sublayer 108 can include at least 30% water soluble polymer and up to 100% water soluble polymer.

The first water soluble sublayer 108 can include one or more fillers, such as vinyl acetate polymers. In an embodiment, the first water soluble sublayer 108 can include at least 0.5% fillers and up to 20% fillers.

The first water soluble sublayer 108 can include one or more antiblock compounds, such as silicas or waxes. In an embodiment, the first water soluble sublayer 108 can include at least 0.1% antiblock compound and up to 2.50% antiblock compound. The first water soluble sublayer 108 can include one or more slip release agents, such as waxes or silicas. In an embodiment, the first water soluble sublayer 108 can include at least 0.1% slip release agents and up to 2.5% slip release agents.

The first water soluble sublayer 108 can include one or more plasticizers, such as glycerol or polyethylene glycol. In an embodiment, the first water soluble sublayer 108 can include at least 0.1% plasticizer and up to 10% plasticizer.

The first water soluble sublayer 108 can include one or more surfactants. In an embodiment, the first water soluble sublayer 108 can include at least 0.05% surfactant and up to 2% surfactant.

The second water soluble sublayer 110 can include one or more water soluble polymers such as polyvinyl alcohol, polyvinylpyrollidone, polyethylene oxide, cellulose, and other water soluble polymer types. In an embodiment, the second water soluble sublayer 110 can include at least 30% water soluble polymers and up to 100% water soluble polymers.

The second water soluble sublayer 110 can include one or more filler such as vinyl acetate polymers. In an embodiment, the second water soluble sublayer 110 can include at least 0.5% fillers and up to 20% fillers.

The second water soluble sublayer 110 can include one or more antiblock compound such as silicas or waxes. In an embodiment, the second water soluble sublayer 110 can include at least 0.1% antiblock compounds and up to 2.5% antiblock compounds. The second water soluble sublayer 110 can include one or more plasticizers such as glycerol or polyethylene glycol. In an embodiment, the second water soluble sublayer 410 can include at least 0.1% plasticizers and up to 10% plasticizers.

The second water soluble sublayer 110 can include one or more surfactant. In an embodiment, the second water soluble sublayer 110 can include at least 0.05% surfactant and up to 2% surfactant.

Figure 2:
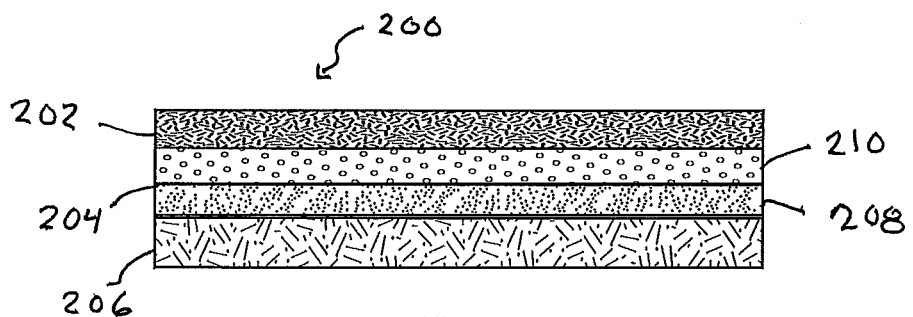
FIG. 2 is a schematic of a cross section of an implementation of an in receptive media constructed and arranged in accordance with an implementation of the invention.

FIG. 2 shows a cross section of ink receptive media 200, according to an embodiment. The ink receptive media 200 can include a water soluble ink receptive top coat 202, a water soluble sublayer 204, and a polyester carrier 206. The water soluble sublayer 204 can include two or more layers, such as a first water soluble sublayer 208 and a second water soluble sublayer 210. In an embodiment, the water soluble sublayer 204 only includes the first water soluble sublayer 208.

The water soluble ink receptive top coat 202 can be at least 0.05 mils thick and up to 0.5 mils thick. The first water soluble sublayer 208 can be at least 0.05 mils thick and up to 0.2 mils thick. The second water soluble sublayer 210 can be at least 0.05 mils thick and up to 0.5 mils thick. The polyester carrier 206 can be at least 0.1 mils thick and up to 1.0 mils thick, such as 0.5 mils. In an embodiment, the polyester carrier 206 can be non-stretchable.

The ink receptive media 200 can be designed for the transfer of ink jetted acid resist pattern, such as to a mold that needs to be registered with features on the mold or with previously etched patterns. In an embodiment, the flexible, non-stretchable polyester carrier 206 can be configured to allow for the ink receptive media 200 to conform to the surface of the mold without distorting the pattern. The release of the polyester carrier 206 can allow for the remaining portion of the ink receptive media 200 to be burnished into a pre-existing etched feature up to 100 microns deep. The ink receptive media 200 can be coated onto a laminate, such that a user only sees the coating on the polyester carrier.

The water soluble ink receptive top coat 202 can include one or more water soluble polymers, such as polyvinyl alcohol, polyvinylpyrollidone, polyethylene oxide, cellulose, and other water soluble polymer types. In an embodiment, the water soluble ink receptive top coat 202 can include at least 30% water soluble polymer and up to 100% water soluble polymer.

The water soluble ink receptive top coat 202 can include one or more low surface energy polymers or particles such as fluorinated polymers, fluorinated particles, siloxanes, waxes, treated silicas, or fluorinated surfactants. In an embodiment, the water soluble ink receptive top coat 202 can include at least 0.5% low surface energy polymers and up to 50% low surface energy polymers.

The water soluble ink receptive top coat 202 can include one or more plasticizers such as glycerol or polyethylene glycol. In an embodiment, the water soluble ink receptive top coat 202 can include at least 0.1% plasticizers and up to 10% plasticizers.

The water soluble ink receptive top coat 202 can include a surfactant. In an embodiment, the water soluble ink receptive top coat 202 can include at least 0.05% surfactant and up to 2% surfactant.

The first water soluble sublayer 208 can include one or more water soluble polymers, such as polyvinyl alcohol, polyvinylpyrollidone, polyethylene oxide, cellulose, and other water soluble polymer types. In an embodiment, the first water soluble sublayer 208 can include at least 30% water soluble polymer and up to 100% water soluble polymer.

The first water soluble sublayer 208 can include one or more fillers, such as vinyl acetate polymers. In an embodiment, the first water soluble sublayer 208 can include at least 0.5% fillers and up to 20% fillers.

The first water soluble sublayer 208 can include one or more plasticizers, such as glycerol or polyethylene glycol. In an embodiment, the first water soluble sublayer 208 can include at least 0.1% plasticizer and up to 10% plasticizer.

The first water soluble sublayer 208 can include one or more surfactant. In an embodiment, the first water soluble sublayer 208 can include at least 0.05% surfactant and up to 2% surfactant.

The second water soluble sublayer 210 can be a release layer. The second water soluble sublayer 210 can include one or more water soluble polymers such as polyvinyl alcohol, polyvinylpyrollidone, polyethylene oxide, cellulose, and other water soluble polymer types. In an embodiment, the second water soluble sublayer 210 can include at least 30% water soluble polymers and up to 100% water soluble polymers.

The second water soluble sublayer 210 can include one or more adhesives, such as vinyl acetate copolymers, UV curable acrylates, or latex.

The second water soluble sublayer 210 can include one or more antiblock compound such as silicas or waxes. In an embodiment, the second water soluble sublayer 510 can include at least 0.1% antiblock compounds and up to 2.5% antiblock compounds.

The second water soluble sublayer 210 can include one or more plasticizers such as glycerol or polyethylene glycol. In an embodiment, the second water soluble sublayer 410 can include at least 0.1% plasticizers and up to 10% plasticizers.

The second water soluble sublayer 210 can include one or more surfactant. In an embodiment, the second water soluble sublayer 210 can include at least 0.05% surfactant and up to 2% surfactant.

Figure 3:
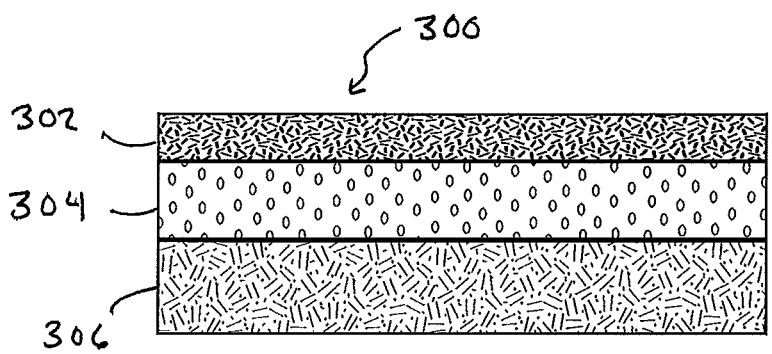
FIG. 3 is a schematic of a cross section of an implementation of an in receptive media constructed and arranged in accordance with an implementation of the invention.

FIG. 3 shows a cross section of ink receptive media 300, according to an embodiment. The ink receptive media 300 can be used for printing of rapid protoypink ink, such as for 3 dimensional textures. The ink receptive media 300 can be used as plaques for viewing the texture or utilized as a wrap for prototype parts. The ink receptive media 300 can have up to 100 percent elongation, which can allow for the prototype texture to be stretched, such as to reduce or eliminate seams, while returning to within 10 percent of its length after stretching. The elasticity can allow the ink receptive media 300 to return to within 10% of its original length, such as where initial stretch causes unacceptable pattern distortion. The ink receptive media 300 can ensure high prototype ink adhesion during stretch and for durability on the applied part.

The ink receptive media 300 can include a water insoluble ink receptive top coat 302, a water insoluble sublayer 304, and a polyester carrier 306. The water insoluble ink receptive top coat 302 can be at least 0.05 mils thick and up to 0.5 mils thick. The water insoluble sublayer 304 can be at least 0.2 mils thick and up to 8.0 mils thick. The polyester carrier 306 can be at least 2.0 mils thick and up to 4.0 mils thick.

The water insoluble ink receptive top coat 302 can include one or more water insoluble polymers, such as polyvinyl alcohol, polyurethanes, and vinyl acetate copolymers. In an embodiment, the water insoluble ink receptive top coat 302 can include at least 30% water insoluble polymers and up to 100% water insoluble polymers.

The water insoluble ink receptive top coat 302 can include one or more low surface energy polymers or particles such as fluorinated polymers, fluorinated particles, siloxanes, waxes, treated silicas, or fluorinated surfactants. In an embodiment, the water insoluble ink receptive top coat 302 can include at least 0.5% low surface energy polymers and up to 50% low surface energy polymers.

The water insoluble ink receptive top coat 302 can include one or more plasticizers such as glycerol or polyethylene glycol. In an embodiment, the water insoluble ink receptive top coat 302 can include at least 0.1% plasticizers and up to 10% plasticizers.

The water insoluble ink receptive top coat 302 can include a surfactant. In an embodiment, the water insoluble ink receptive top coat 302 can include at least 0.05% surfactant and up to 2% surfactant.

The water insoluble sublayer 304 can include one or more water insoluble polymers, such as polyvinyl alcohol, vinyl acetate copolymers, polyurethanes, or other film forming water insoluble polymers. In an embodiment, the water insoluble sublayer 304 can include at least 30% water insoluble polymer and up to 100% water insoluble polymer.

The water insoluble sublayer 304 can include one or more antiblock compound, such as waxes or silicas. In an embodiment, the inwater soluble sublayer 304 can include at least 0.1% antiblock compounds and up to 2.5% antiblock compounds.

The water insoluble sublayer 304 can include one or more slip release agents, such as waxes or silica. In an embodiment, the water insoluble sublayer 304 can include at least 0.1% slip release agents and up to 2.5% slip release agents.

The water insoluble sublayer 304 can include one or more plasticizers, such as glycerol, polyethylene glycol, or benzoate esters. In an embodiment, the water insoluble sublayer 304 can include at least 0.1% plasticizer and up to 10% plasticizer.

The water insoluble sublayer 304 can include one or more surfactant. In an embodiment, the water insoluble sublayer 304 can include at least 0.05% surfactant and up to 2% surfactant.

Figure 4:
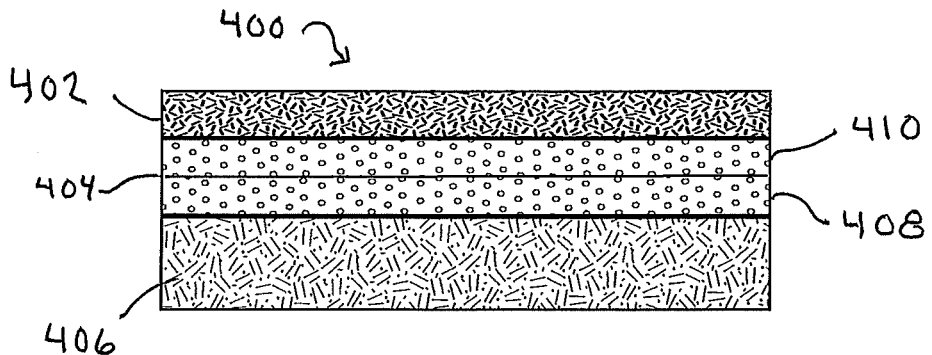
FIG. 4 is a schematic of a cross section of an implementation of an in receptive media constructed and arranged in accordance with an implementation of the invention.

FIG. 4 shows a cross section of ink receptive media 400, according to an embodiment. The ink receptive media 400 can be used to transfer ink jetted acid resist to cavities of previously etched surfaces, such as with limited registration possibilities. The stretch of the ink receptive media 400 can be up to 100% and can allow for the ink receptive media 400 to stretch into cavities of pre-etched surfaces while the diminished elasticity allows the ink receptive media 400 to remain applied to the etched surface, but return is less than 10 percent after a 100 percent stretch.

The ink receptive media 400 can include a water soluble ink receptive top coat 402, a water soluble sublayer 404, and a polyester carrier 406. The water soluble sublayer 404 can include two or more layers, such as a first water soluble sublayer 408 and a second water soluble sublayer 410. In an embodiment, the first water soluble sublayer 408 can be combined with the second water soluble sublayer 410.

The water soluble ink receptive top coat 402 can be at least 0.05 mils thick and up to 0.5 mils thick. The first water soluble sublayer 408 can be at least 0.05 mils thick and up to 0.5 mils thick. The second water soluble sublayer 410 can be at least 0.1 mils thick and up to 0.5 mils thick. The polyester carrier 406 can be at least 0.5 mils thick and up to 5 mils thick.

The water soluble ink receptive top coat 402 can include one or more water soluble polymers, such as polyvinyl alcohol, polyvinylpyrollidone, polyethylene oxide, cellulose, and other water soluble polymer types. In an embodiment, the water soluble ink receptive top coat 402 can include at least 30% water soluble polymer and up to 100% water soluble polymer.

The water soluble ink receptive top coat 402 can include one or more low surface energy polymers or particles such as fluorinated polymers, fluorinated particles, siloxanes, waxes, treated silicas, or fluorinated surfactants. In an embodiment, the water soluble ink receptive top coat 402 can include at least 0.5% low surface energy polymers and up to 50% low surface energy polymers.

The water soluble ink receptive top coat 402 can include one or more plasticizers such as glycerol or polyethylene glycol. In an embodiment, the water soluble ink receptive top coat 402 can include at least 0.1% plasticizers and up to 10% plasticizers.

The water soluble ink receptive top coat 402 can include a surfactant. In an embodiment, the water soluble ink receptive top coat 402 can include at least 0.05% surfactant and up to 2% surfactant.

The first water soluble sublayer 408 can include one or more water soluble polymers, such as polyvinyl alcohol, polyvinylpyrollidone, polyethylene oxide, cellulose, and other water soluble polymer types. In an embodiment, the first water soluble sublayer 408 can include at least 30% water soluble polymer and up to 100% water soluble polymer.

The first water soluble sublayer 408 can include one or more fillers, such as vinyl acetate polymers. In an embodiment, the first water soluble sublayer 408 can include at least 0.5% fillers and up to 20% fillers.

The first water soluble sublayer 408 can include one or more antiblock compound, such as silicas or waxes. In an embodiment, the first water soluble sublayer 408 can include at least 0.1% antiblock compound and up to 2.5% antiblock compound.

The first water soluble sublayer 408 can include one or more slip release agents, such as waxes or silicas. In an embodiment, the first water soluble sublayer 408 can include at least 0.1% slip release agents and up to 2.5% slip release agents.

The first water soluble sublayer 408 can include one or more plasticizers, such as glycerol or polyethylene glycol. In an embodiment, the first water soluble sublayer 408 can include at least 0.1% plasticizer and up to 10% plasticizer.

The first water soluble sublayer 408 can include one or more surfactant. In an embodiment, the first water soluble sublayer 408 can include at least 0.05% surfactant and up to 2% surfactant.

The second water soluble sublayer 410 can include one or more water soluble polymers such as polyvinyl alcohol, polyvinylpyrollidone, polyethylene oxide, cellulose, and other water soluble polymer types. In an embodiment, the second water soluble sublayer 410 can include at least 30% water soluble polymers and up to 100% water soluble polymers.

The second water soluble sublayer 410 can include one or more filler such as vinyl acetate polymers. In an embodiment, the second water soluble sublayer 410 can include at least 0.5% fillers and up to 20% fillers.

The second water soluble sublayer 410 can include one or more antiblock compound such as silicas or waxes. In an embodiment, the second water soluble sublayer 410 can include at least 0.1% antiblock compounds and up to 2.5% antiblock compounds.

The second water soluble sublayer 410 can include one or more plasticizers such as glycerol or polyethylene glycol. In an embodiment, the second water soluble sublayer 410 can include at least 0.1% plasticizers and up to 10% plasticizers.

The second water soluble sublayer 410 can include one or more surfactant. In an embodiment, the second water soluble sublayer 410 can include at least 0.05% surfactant and up to 2% surfactant.

The embodiments of the present invention described herein are not intended to be exhaustive or to limit the invention to the precise forms disclosed in the following detailed description. Rather, the embodiments are chosen and described so that others skilled in the art can appreciate and understand the principles and practices of the present invention.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. However, it should be understood that many variations and modifications may be made while remaining within the spirit and scope of the invention.

The Claims are:

1. A multilayer ink receptive film for transfer of an acid-etch resist, the film comprising:
   an ink receptive layer containing a reduced energy surface, the ink receptive layer selected to limit absorption of the acid-etch resist into the ink receptive film;
   one or more stretchable functional sublayers which facilitate application of the film to a substrate; and
   a carrier film;
   wherein the carrier film is removable from the stretchable functional sublayers such that the functional sublayers may be stretched to fit a surface to which the acid-etch resist is applied,
   wherein the reduced energy surface comprises one or more of a dispersion of a fluoropolymer, fluorinated particles, siloxanes, waxes or fluorinated surfactants.

2. The ink receptive film of claim 1, wherein the fluoropolymer is selected from the group of polytetrafluoroethylene, fluorinated ethylene propylene, and combinations thereof.

3. A multilayer ink receptive film for transfer of an acid-etch resist, the film comprising:
   an ink receptive layer containing a reduced energy surface, the ink receptive layer selected to limit absorption of the acid-etch resist into the ink receptive film;
   one or more stretchable functional sublayers which facilitate application of the film to a substrate; and
   a carrier film;
   wherein the carrier film is removable from the stretchable functional sublayers such that the functional sublayers may be stretched to fit a surface to which the acid-etch resist is applied;
   wherein the ink receptive layer comprises a plasticizer.

4. The ink receptive film of claim 3, wherein the plasticizer is selected from glycerol, polyethylene glycol and combinations thereof.

5. A multilayer ink receptive film for transfer of an acid-etch resist, the film comprising:
   an ink receptive layer containing a reduced energy surface, the ink receptive layer selected to limit absorption of the acid-etch resist into the ink receptive film;
   one or more stretchable functional sublayers which facilitate application of the film to a substrate; and
   a carrier film;
   wherein the carrier film is removable from the stretchable functional sublayers such that the functional sublayers may be stretched to fit a surface to which the acid-etch resist is applied; and
   further comprising a sub layer having adhesive properties;
   wherein the sub layer comprises acrylic adhesive.

6. A multilayer ink receptive film for transfer of an acid-etch resist, the film comprising:
   an ink receptive layer containing a reduced energy surface, the ink receptive layer selected to limit absorption of the acid-etch resist into the ink receptive film;
   one or more stretchable functional sublayers which facilitate application of the film to a substrate; and
   a carrier film;
   wherein the carrier film is removable from the stretchable functional sublayers such that the functional sublayers may be stretched to fit a surface to which the acid-etch resist is applied, wherein the carrier film is less than 1.5 mils thick.

7. A multilayer ink receptive film for retention of a surface-texturizing ink material, the film comprising:
   an ink receptive layer containing a reduced energy surface comprising a wax, fluoropolymer, fluorinated particles siloxanes, waxes or fluorinated surfactants, the ink receptive layer limiting absorption of the surface-texturizing ink material into the ink receptive film;
   one or more stretchable functional sublayers which facilitate application of the film to a substrate, the one or more stretchable functional sub layers being substantially water insoluble; and
   a carrier film wherein the carrier film is removable from the stretchable functional sublayers such that the stretchable functional sublayers may be stretched to conform to a surface to which the surface-texturizing ink material is applied.

8. The multilayer ink receptive film of claim 7, further comprising a sub layer containing a polyurethane dispersion.

* * * * *